United States Patent [19]

Hamburg

[11] Patent Number: 5,099,647
[45] Date of Patent: Mar. 31, 1992

[54] COMBINED ENGINE AIR/FUEL CONTROL AND CATALYST MONITORING

[75] Inventor: Douglas R. Hamburg, Birmingham, Mich.

[73] Assignee: Ford Motor Company, Dearborn, Mich.

[21] Appl. No.: 722,797

[22] Filed: Jun. 28, 1991

[51] Int. Cl.⁵ .............................. F01N 3/18
[52] U.S. Cl. ........................ 60/274; 60/276; 60/277; 60/285; 123/489
[58] Field of Search ............... 123/440, 489, 589; 60/274, 276, 285

[56] References Cited

U.S. PATENT DOCUMENTS

| | | | |
|---|---|---|---|
| 4,177,787 | 12/1979 | Hattori et al. | 123/198 |
| 4,463,594 | 8/1984 | Raff | 123/440 |
| 4,534,330 | 8/1985 | Osuga et al. | 123/440 |
| 4,691,562 | 9/1987 | Abthoff et al. | 73/118.1 |

OTHER PUBLICATIONS

SAE Paper #800018, "Non-Ideal Properties of $ZrO_2$ and $TiO_2$ Exhaust Gas Oxygen Sensors", M. A. Shulman and D. R. Hamburg.

*Primary Examiner*—Ira S. Lazarus
*Assistant Examiner*—L. Heyman
*Attorney, Agent, or Firm*—Peter Abolins; Roger L. May

[57] ABSTRACT

An engine air/fuel control and catalyst monitoring means includes a first EGO sensor positioned upstream of a catalyst and a second EGO sensor positioned downstream of the catalyst. Outputs from both EGO sensors are applied to a complementary filter set. The output from the upstream EGO sensor is applied to a high pass filter section and the output from the downstream EGO sensor is applied to a low pass filter section. The summer receives inputs from each of the high pass and low pass filter sections and provides an output to a feedback controller which in turn controls a fuel metering system applying fuel to the engine. The downstream EGO sensor also provides a signal indicative of the efficiency of the catalyst.

14 Claims, 3 Drawing Sheets

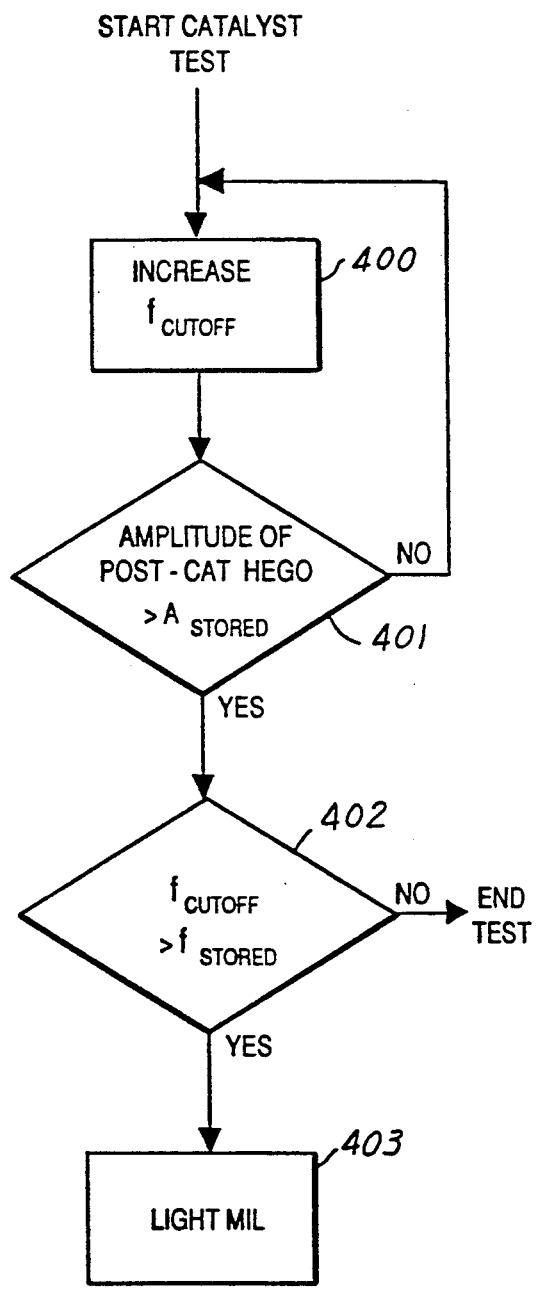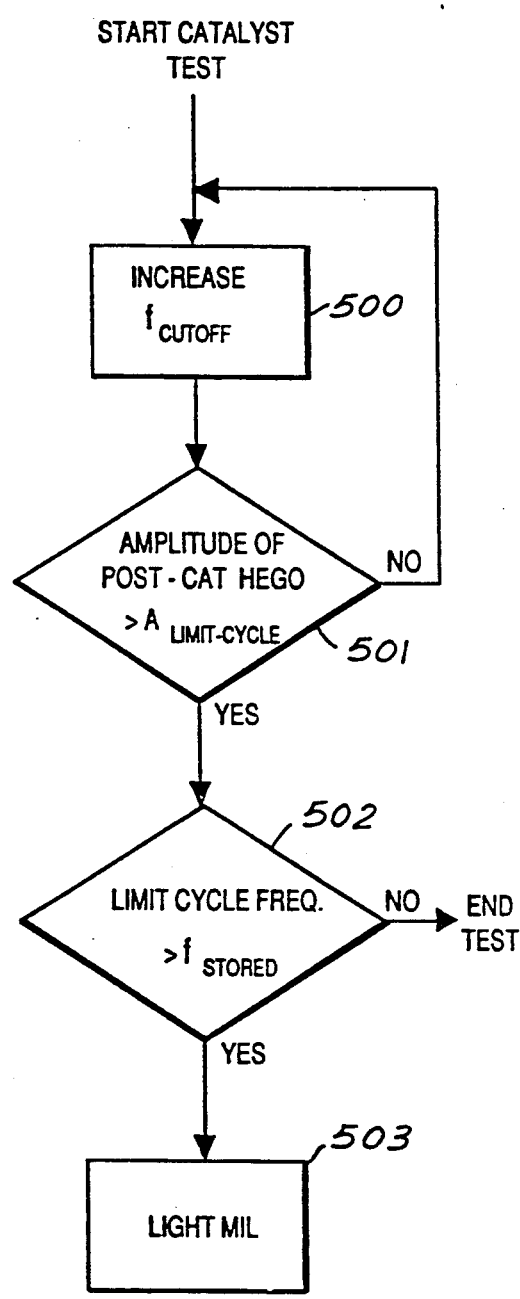

COMBINED ENGINE AIR/FUEL CONTROL AND CATALYST MONITORING

BACKGROUND OF THE INVENTION

1. Field of the Invention

This invention relates to engine control and monitoring.

2. Prior Art

Many air/fuel control systems in present-day vehicles use a HEGO (heated exhaust gas oxygen) sensor located in front of a catalyst to provide the air/fuel feedback signal for closed-loop air/fuel operation. There are, however, two significant problems that exist with this arrangement. The first problem is that the HEGO sensor can be poisoned by certain components in the raw exhaust gas, thus causing the sensor characteristics to change with time. The second problem is that the HEGO sensor may not be able to bring the exhaust gases flowing by it to chemical equilibrium, thus causing the sensor to exhibit air/fuel offset errors which are dependent on engine load and cylinder-to-cylinder air/fuel maldistribution. (See, for example, SAE paper #800018 "Non-Ideal Properties of $ZrO_2$ and $TiO_2$ Exhaust Gas Oxygen Sensors" by M. A. Shulman and D. R. Hamburg.)

These problems can be solved by placing the feedback HEGO sensor after the catalyst so that the sensor will be protected by the catalyst, and the exhaust gases will be brought to chemical equilibrium. Although this arrangement is being planned for many future vehicles, it still requires the use of a HEGO sensor in front of the catalyst to provide fast closed-loop time response. In general, the time response of the HEGO sensor located after the catalyst is very slow because of the storage characteristics of the catalyst It would be desirable to combine the output of a HEGO sensor located in front of the catalyst with that of a HEGO sensor located after the catalyst in such a way as to provide a single composite signal having the low frequency components of the post-catalyst sensor and the high frequency components of the pre-catalyst sensor.

SUMMARY OF THE INVENTION

An embodiment of this invention provides precise closed-loop control of engine air/fuel ratio and an indication of catalyst conversion efficiency degradation. The invention uses a complementary filter to synthesize a single exhaust gas oxygen (EGO) sensor output from sensors located upstream and downstream of a catalyst and, generate a malfunction signal indicating a three-way catalyst degradation. In accordance with an embodiment of this invention, a single composite signal is derived from the output of an EGO sensor located in front of the catalyst and an EGO sensor located after the catalyst.

The composite output signal of the configuration can be connected directly to the normal HEGO sensor input of existing air/fuel controllers (such as that in an engine control computer) without any modifications to the controller. An added advantage of the proposed implementation is that it will also provide an output signal which can be used for catalyst monitoring. For example, it may be advantageous to generate a malfunction indication whenever the hydrocarbon (HC) conversion efficiency of the catalyst in a motor vehicle has dropped below approximately 50%.

In order to obtain a single composite signal which has the low frequency components of the post-catalyst sensor and the high frequency components of the pre-catalyst sensor, and which does not have crossover frequency distortion, the invention proposes to use a complementary filter set. Normally, a complementary filter set is used to split a single input signal having a wide frequency spectrum into a multiplicity of outputs each covering a specific, but different, portion of the overall frequency band. In the present invention, the complementary filter set is used in reverse to synthesize one wide frequency band signal from two separate signals.

BRIEF DESCRIPTION OF THE DRAWINGS

FIG. 4 is a logic flow diagram for an embodiment of this invention wherein cutoff frequency is increased until a predetermined EGO sensor output amplitude is achieved; and FIG. 5 is a logic flow diagram in accordance with another embodiment of this invention wherein cutoff frequency is increased until limit cycle operation is reached and then the limit cycle frequency is examined

DETAILED DESCRIPTION OF THE INVENTION

Figure 1:
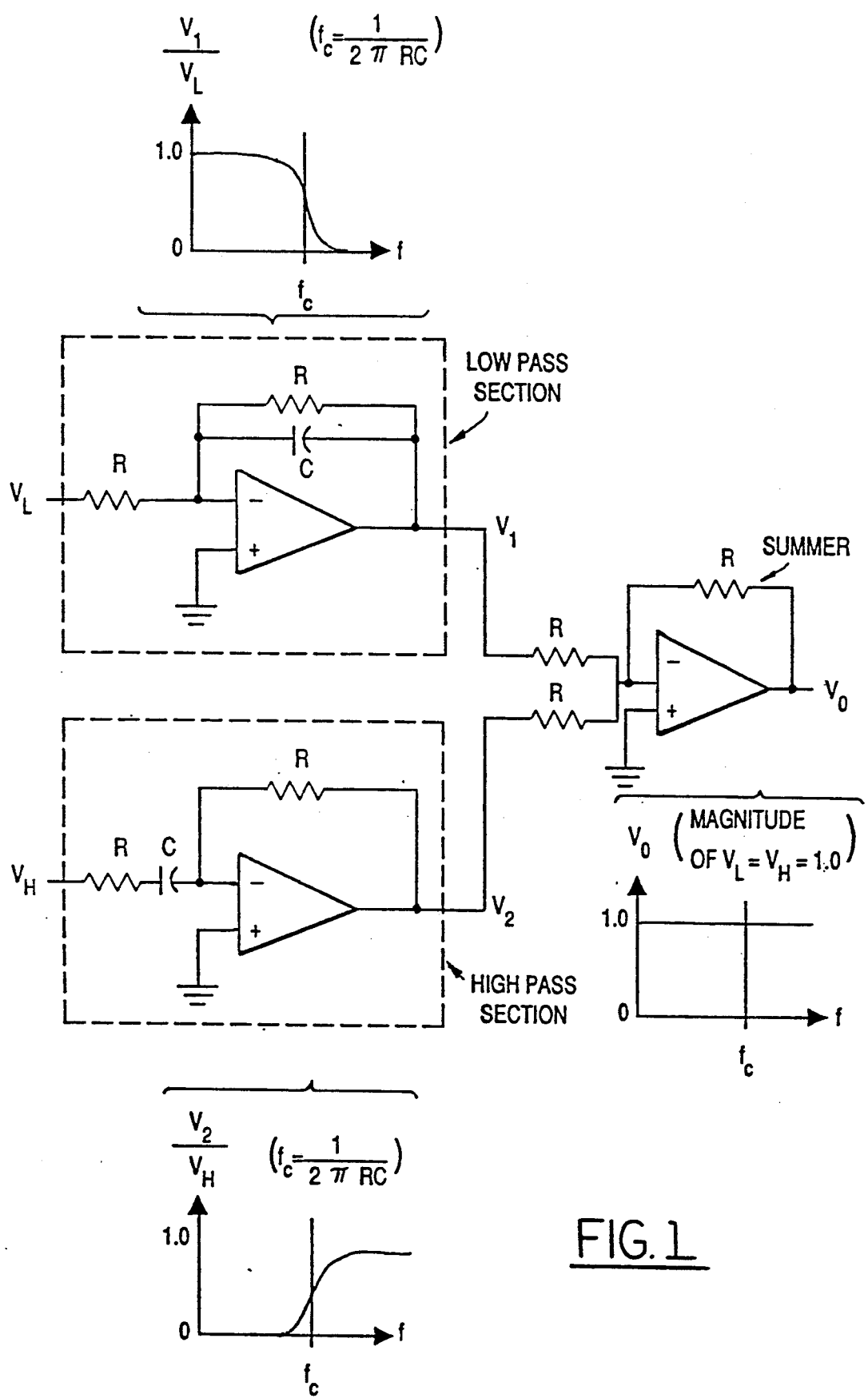
FIG. 1 is a schematic diagram, including associated waveforms, of a complementary filter designed to synthesize a single EGO sensor output from EGO sensors before and after a three-way catalyst, in accordance with an embodiment of this invention.
Figure 2:
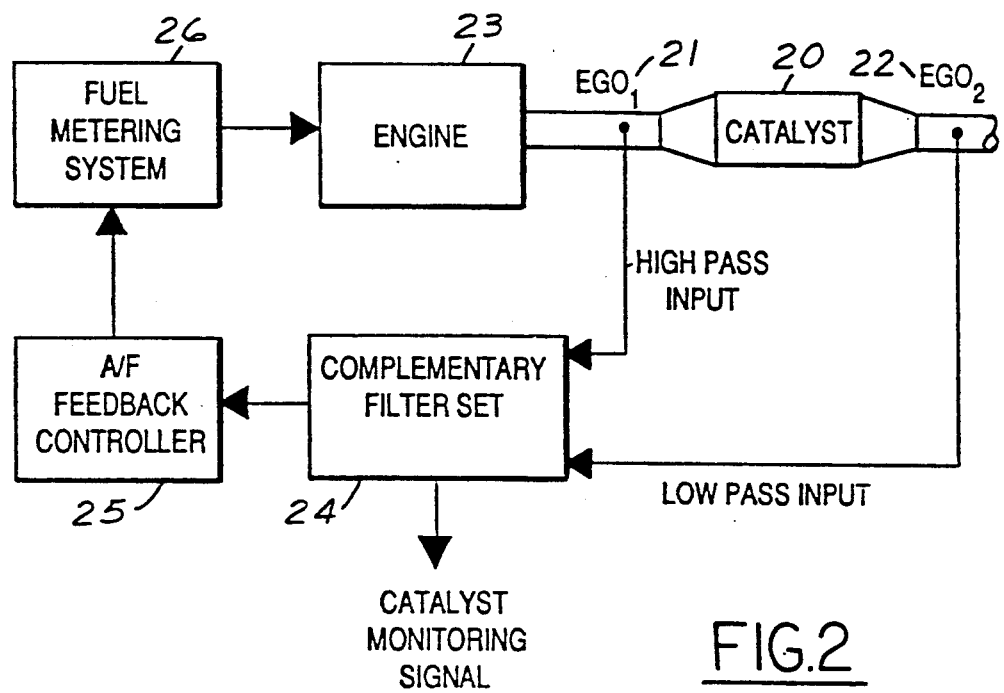
FIG. 2 is a simplified block diagram of a combined air/fuel sensing and catalyst monitoring output system having separate air/fuel feedback and catalyst monitoring output signals, in accordance with an embodiment of this invention.

Referring to FIGS. 1 and 2, a combined air/fuel sensing and catalyst monitoring system having separate air/fuel feedback and catalyst monitoring output signals is shown and includes a low pass section coupled to the signal from a post-catalyst HEGO (heated exhaust gas oxygen) sensor and a high pass section coupled to the pre-catalyst HEGO sensor. Signals from the two EGO sensors ($V_L$ and $V_H$) and are combined to synthesize one wide frequency band signal from two separate signals.

An example of a complementary filter set used in this manner is shown in FIG. 1. Referring to this example, the low pass section of the filter set has a transfer function equal to $1/[1+j(f/f_c)]$, while the high pass section has a transfer function equal to $j(f/f_c)/[1+j(f/f_c)]$. In these expressions, j is the y-axis vector, f is the frequency of any signal component, and $f_c$ is the crossover frequency of the filter sections Frequencies lower than $f_c$ will pass through the low pass section, but not through the high pass section. Frequencies higher than $f_c$ will pass through the high pass section, but not through the low pass section. If signals having a unity amplitude for all frequencies are applied to both the low pass and high pass inputs of the filter set, then the composite output will simply be the sum of the two transfer functions, or will be equal to $\{1/[1+j(f/f_c)]\}+\{j(f/f_c)/[1+j(f/f_c)]\}$ which is 1.

Thus, if the pre-catalyst HEGO sensor output is applied to the input of the high pass filter section, and the post-catalyst HEGO sensor output is applied to the input of the low pass filter section, then the frequency components from 0 to $f_c$ in the pre-catalyst HEGO sensor output will be removed and replaced by the frequency components from 0 to $f_c$ from the post-catalyst HEGO sensor. Since the overall transfer function will be unity (as shown above) for all frequencies, the resulting composite HEGO sensor signal will have no crossover frequency distortion.

In summary, this invention synthesizes a single air/fuel feedback signal from a pre-catalyst EGO sensor and a post-catalyst EGO sensor. This synthesizing is done using a complementary filter set. Different types of sensors can be used for the pre-catalyst and the post-catalyst EGO sensors, provided that the amplitude versus air/fuel characteristics of the sensors are scaled the same. For example, the pre-catalyst sensor can be a UEGO sensor, universal EGO sensor having a linear output, and a HEGO sensor, heated EGO sensor, properly scaled, can be used for the post-catalyst EGO sensor. This is presently believed to be an advantageous combination.

In order to generate a catalyst monitoring signal with this configuration, the output of the post-catalyst HEGO sensor is examined before it is processed by the low pass section of the complementary filter. In particular, the amplitude of the unfiltered post-catalyst HEGO sensor output may be monitored. In one embodiment of the invention, the crossover frequency of the complementary filter would be set at a relatively low value during the catalyst testing interval In this manner, regardless of the catalyst conversion efficiency, a limit cycle oscillation would not result in the post-catalyst HEGO sensor feedback loop, and the post-catalyst HEGO sensor output will fluctuate in a somewhat random manner. If the catalyst is very fresh, it might be impossible to completely prevent a limit cycle oscillation without using exceptionally low values for the crossover frequency, but this will not affect the basic operation of the invention. With this implementation, the amplitude fluctuations of the post-catalyst HEGO sensor will decrease as the conversion efficiency of the catalyst drops when the feedback gain is set to a low value.

In this version of the present invention, it is therefore proposed to detect any degradation in the catalyst conversion efficiency by simply looking for a decrease in the amplitude of the HEGO sensor output fluctuations compared to the value measured with a good catalyst. In particular, when the amplitude of the HEGO sensor output voltage fluctuations drops below a predetermined value, the catalyst would be judged as defective, and the malfunction indication light would be energized, if desired.

In another embodiment of the invention, operation of the catalyst monitoring scheme as described above would be modified by having a feedback control system automatically adjust the value of the crossover frequency so as to maintain the HEGO sensor output amplitude fluctuations at some particular value; or, alternately, to maintain a clearly defined limit cycle oscillation. In this manner, as the conversion efficiency of the catalyst decreases with age, the crossover frequency would automatically be increased. With this version of the invention, therefore, catalyst failure can be detected by sensing when the crossover frequency exceeds some preset value. That is, crossover frequency will be higher for low conversion efficiency catalysts than it will for high conversion efficiency catalysts. When this occurs, the malfunction indicator light can be energized, if desired.

Referring to FIG. 4, an embodiment as discussed above starts by beginning a catalyst test and then at block 400 the cutoff frequency is increased. Logic flow then goes to a decision block 401 wherein the amplitude of the post-catalyst HEGO sensor is compared to a stored amplitude. If the amplitude is not greater than the stored amplitude, logic flow returns to block 400. If the amplitude is greater than the stored amplitude, logic flow goes to a decision block 402. At decision block 402 the cutoff frequency is compared to the stored frequency. If the cutoff frequency is not greater than the stored frequency, the test ends If the cutoff frequency is greater than the stored frequency, logic flow goes to a block 403 wherein a malfunction indication light (MIL) is lit.

In a third version of the invention, the crossover frequency would initially be set at a low value at the beginning of the catalyst testing interval. The low crossover frequency is necessary in order to avoid an unacceptably high amplitude limit cycle oscillation involving the post-catalyst EGO sensor which would saturate the catalyst The crossover frequency would then be increased until a clearly defined limit cycle oscillation in the post-catalyst HEGO sensor feedback loop was just produced as indicated by the output of the post-catalyst HEGO sensor. Once a definite limit cycle oscillation was detected, the crossover frequency would be held constant during the remainder of the testing interval, and the frequency of the limit cycle would be determined. Catalyst failure would be considered as having occurred when the limit cycle frequency was greater than a certain predetermined value.

Referring to FIG. 5, the start of the catalyst test in accordance with the third version begins at a block 500 wherein the cutoff frequency is increased. Logic flow then goes to a decision block 501 wherein the amplitude of the post-catalyst exhaust gas oxygen sensor is compared to the amplitude of the limit cycle signal. If the amplitude of the post-catalyst exhaust gas oxygen sensor is greater than the amplitude of the limit cycle, logic flow goes to a decision block 502. If it is not, logic flow goes back to 500 where the frequency cutoff is increased again. At decision block 502, the limit cycle frequency is compared to a stored frequency If the limit cycle frequency detected is not greater than the stored frequency, the test ends. If the limit cycle of frequency is greater than the stored frequency, logic flow goes to a block 503 wherein a malfunction indication light is lit.

When performing the catalyst monitoring tests discussed above, it will be necessary to prevent feed through from the pre-catalyst EGO sensor. This is desirable to reduce the gain of the pre-catalyst HEGO sensor feedback loop in order to prevent high amplitude limit cycle oscillations in that loop, or use a UEGO sensor for the pre-catalyst sensor, or filter the output of the post-catalyst sensor. This is required so that the catalyst monitoring system will not produce an erroneous output indication due to high amplitude air/fuel fluctuations generated in the pre-catalyst HEGO sensor feedback loop. When the catalyst monitoring tests are not being performed, which is the majority of the time, the gain of the pre-catalyst HEGO sensor feedback loop will be increased back to its normal value so that the proper dynamic time response of that loop will be realized. Furthermore, the crossover frequency of the complementary filter will be set at a sufficiently low value so that the post-catalyst HEGO sensor feedback loop will not operate in a true limit cycle mode. In this way, the post-catalyst HEGO sensor feedback loop will provide the desired dc level correction to the air/fuel control system without causing high amplitude, low frequency, air/fuel fluctuations at the catalyst.

As the catalyst ages and the post-catalyst HEGO sensor output fluctuations decrease, the value of the crossover frequency can be increased somewhat in order to improve the updating time response of the post-catalyst HEGO sensor feedback loop. Of course, the crossover frequency should not be increased to the point that it produces a discernible limit cycle oscillation in the post-catalyst HEGO sensor feedback loop. In fact, the crossover frequency value could be controlled by a separate feedback loop to insure this. Another very important reason for setting the crossover frequency at a low value is to insure that the phase shift of the post-catalyst HEGO sensor output in the crossover region (relative to the phase shift of the pre-catalyst sensor output) is small compared to the phase shift of the complementary filter. This is advantageous so that the ability of the complementary filter set to eliminate crossover frequency distortion can actually be realized.

A simplified block diagram which summarizes the essential concepts of the invention (but not depicting the catalyst monitoring details) is shown in FIG. 2. A catalyst 20 is coupled to an upstream EGO sensor 21 and a downstream EGO sensor 22. An engine 23 is coupled to provide output gas to catalyst 20. A complementary filter set 24 receives inputs from EGO sensors 21 and 22. The output of complementary filter 24 is coupled to an air/fuel feedback controller 25. A fuel metering system 26 receives an input from air/fuel feedback controller 25 and has an output coupled to control engine 23.

Figure 3:
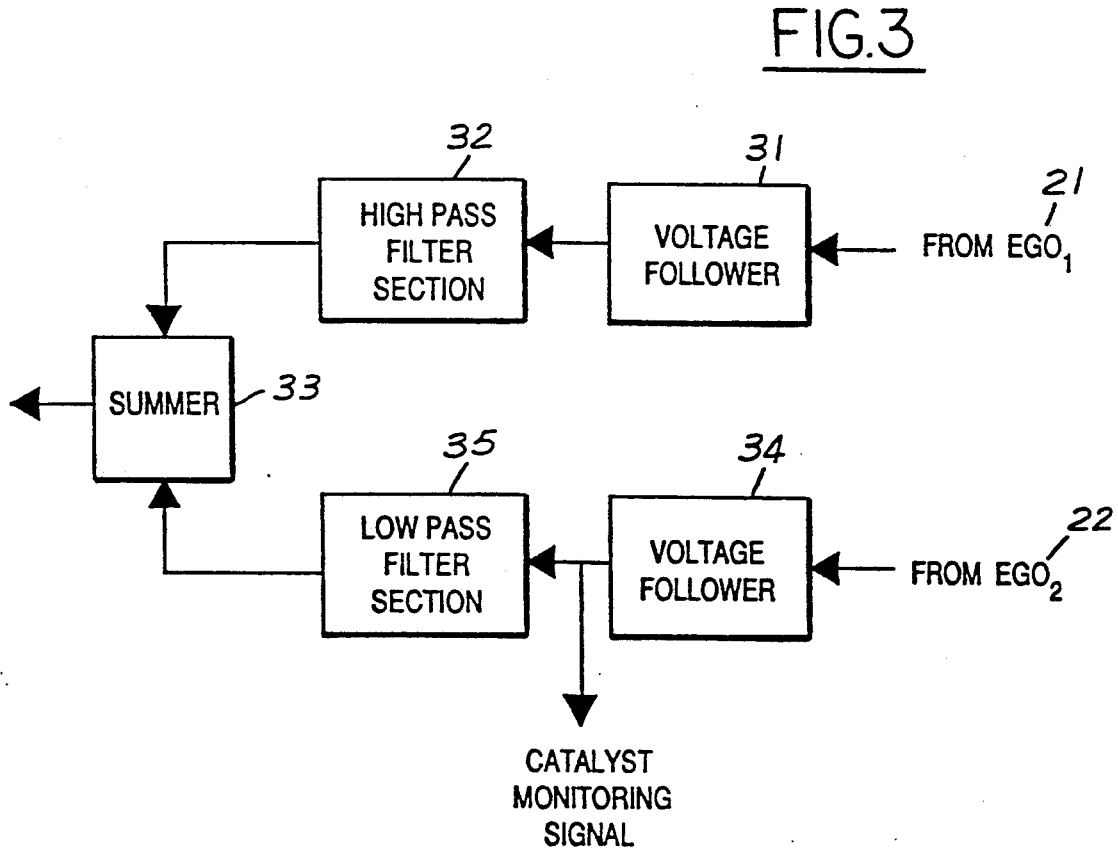
FIG. 3 is a more detailed block diagram of the complementary filter set block of FIG. 2.

Referring to FIG. 3, EGO sensor 21 applies an input to a voltage follower 31 which provides an output to a high pass filter section 32 which provides an input to a summer 33. A voltage follower 34 receives an input from EGO sensor 22 and has an output applied to a low pass filter section 35 which in turn has an output applied to summer 33. The output of voltage follower 34 is also a catalyst monitoring signal.

The basic concept disclosed herein is not dependent on the type of EGO sensor actually employed, and therefore would function with UEGO sensors as well as HEGO sensors. If UEGO sensors were used, the specific strategies might change slightly since these sensors generally would not be used in a limit cycle oscillation mode. It should also be pointed out that, for simplicity, the complementary filter shown in FIG. 1 utilized first order transfer functions for the low pass and high pass sections. In practice, higher order transfer functions might be used to provide a sharper frequency transition between the two sensors. Finally, it should be pointed out that the actual complementary filter functions discussed in this disclosure would likely be implemented in software rather than hardware in order to facilitate changing the value of the crossover frequency.

Various modifications and variations will no doubt occur to those skilled in the art to which this invention pertains. For example, the Particular configuration of the filters may be varied from that disclosed herein. These and all other variations which basically rely on the teachings through which this disclosure has advanced the art are properly considered within the scope of this invention.

What is claimed:

1. An engine control means including: a catalyst;
   a first exhaust gas oxygen sensor upstream of said catalyst;
   a second exhaust gas oxygen sensor downstream of said catalyst; and
   a complementary filter set coupled to said first and second exhaust gas oxygen sensors characterized by a crossover frequency and including:
   a high pass filter coupled to said first EGO sensor;
   a low pass filter coupled to said second EGO sensor; and
   a summer means coupled to the output of said high pass filter and said low pass filter for providing a composite output from said high Pass and low pass filters for use by the engine control means.

2. An engine control means as recited in claim 1 wherein:
   a first voltage follower is coupled between said first EGO sensor and said high pass filter; and
   a second voltage follower coupled between said second EGO sensor and said second low pass filter.

3. An engine control means as recited in claim 2 further comprising:
   a catalyst monitoring output coupled between the second voltage follower and the low pass filter for providing a signal which is a function of degradation of the catalyst conversion efficiency.

4. An engine control means as recited in claim 3 further comprising:
   means for establishing a low crossover frequency;
   means for sensing the amplitude of the catalyst monitoring signal;
   means for comparing the sensed amplitude to a predetermined amplitude; and
   means for determining degradation of the catalyst if the sensed amplitude is less than the predetermined amplitude.

5. An engine control means as recited in claim 3 further comprising:
   means for increasing the crossover frequency until the catalyst monitoring signal reaches a predetermined amplitude;
   means for determining the crossover frequency; frequency to a predetermined frequency; and
   means for determining degradation of the catalyst if the crossover frequency is greater than the predetermined frequency.

6. An engine control means as recited in claim 3 further comprising:
   means for increasing the crossover frequency until the engine control means reaches air/fuel ratio limit cycle operation;
   means for determining the frequency of the limit cycle operation;
   means for comparing the limit cycle frequency to a stored frequency; and
   means for determining degradation of the catalyst if the limit cycle frequency is greater than the stored frequency.

7. An engine control means for an engine including:
   a catalyst in an engine exhaust gas stream;
   a first exhaust gas oxygen (EGO) sensor upstream of said catalyst;
   a second exhaust gas oxygen sensor downstream of said catalyst;

a complementary filter set characterized by a crossover frequency coupled to said first and second exhaust gas oxygen sensors;

said complementary filter set including a high pass filter coupled to said first EGO sensor, and a low pass filter coupled to said second EGO sensor, and a summer coupled to output from the high pass and low pass filters;

an air/fuel feedback controller coupled to an output from said summer for providing a fuel control signal;

a fuel metering system coupled to receive an input from said air/fuel feedback controller for supplying the engine with fuel;

a catalyst monitoring output coupled to said second EGO sensor for providing a signal which is a function of catalyst degradation; and said complementary filter set including means for varying the crossover frequency to facilitate determining catalyst malfunction, so as to increase the crossover frequency from a low value until a catalyst monitoring output signal reaches a predetermined characteristic.

8. A method of controlling an engine including the steps of:

positioning a first exhaust gas oxygen sensor upstream of a catalyst;

positioning a second exhaust gas oxygen sensor downstream of the catalyst; and coupling a complementary filter set having a crossover frequency to the first and second exhaust gas oxygen sensors by:

coupling a high pass filter to the first exhaust gas oxygen sensor;

coupling a low pass filter to the second exhaust gas oxygen sensor; and coupling a summer means to an output of said high pass filter and said low pass filter for providing a composite output from the high pass and low pass filters.

9. A method as recited in claim 8 wherein said method further includes the steps of:

coupling a first voltage follower between the first EGO sensor and the high pass filter; and coupling a second voltage follower between the second EGO sensor and the second low pass filter.

10. A method as recited in claim 8 wherein said method further includes:

coupling a catalyst monitoring signal output between the second voltage follower and the second low pass filter for providing a catalyst monitoring signal whose amplitude is indicative of degradation of the catalyst conversion efficiency.

11. A method as recited in claim 10, wherein said method further includes the step of:

increasing the crossover frequency from a relatively low value until a predetermined characteristic of the catalyst monitoring signal is achieved.

12. A method as recited in claim 10 wherein said catalyst monitoring signal indicates a defective catalyst when the amplitude of said catalyst monitoring signal drops below a predetermined value.

13. A method as recited in claim 11 wherein said catalyst monitoring signal indicates a defective catalyst when a crossover frequency associated with said complementary filter set is greater than a preset frequency, when a predetermined amplitude for the catalyst monitoring signal is reached.

14. A method as recited in claim 11 wherein said catalyst monitoring signal indicates a defective catalyst when a crossover frequency associated with said complementary filter set is increased until limit cycle operation is reached and the limit cycle frequency is greater than a predetermined frequency.

* * * * *